Nov. 9, 1937.   W. A. BLACK   2,098,215
FILM DRIVING APPARATUS
Filed July 14, 1936   2 Sheets-Sheet 1

INVENTOR.
WILLIAM A. BLACK
BY
ATTORNEY.

Nov. 9, 1937.  W. A. BLACK  2,098,215

FILM DRIVING APPARATUS

Filed July 14, 1936  2 Sheets-Sheet 2

INVENTOR.
WILLIAM A. BLACK

BY

ATTORNEY.

Patented Nov. 9, 1937

2,098,215

UNITED STATES PATENT OFFICE 2,098,215

FILM DRIVING APPARATUS

William A. Black, Montclair, N. J., assignor to United Research Corporation, Burbank, Calif., a corporation of Delaware Application July 14, 1936, Serial No. 90,559

8 Claims. (Cl. 271—2.3)

This invention relates to film driving apparatus and particularly to such apparatus employing an automatic clutch whereby a stabilizing element, such as a flywheel rotated by the pull of the film during operation, is driven directly by the motor during starting and acceleration.

The specific form of clutch mechanism is disclosed and claimed in my co-pending application Serial No. 33,737 filed August 31, 1935, the present invention being directed to the arrangement of the drum and flywheel with respect to the clutch mechanism and the clutch mechanism drive.

It is well known that in order to satisfactorily record or reproduce sound that the film must be advanced past the point of contact between the light beam and film or the translation point at a constant and uniform speed. This has been accomplished by the use of a film pulled drum and flywheel arrangement such as disclosed in the above mentioned co-pending application. The present invention, however, contemplates an arrangement whereby the disposition of the various elements of the film driving mechanism, particularly the drum, flywheel, the shaft therefor and the automatic clutch element are so disposed as to permit easy access to any portions thereof and to facilitate assembling and operation.

The primary object of the invention, therefore, is to facilitate the operation, assembly and adjustment of the various elements which cooperate to obtain rapid acceleration of the flywheel, and to maintain stable operation of the film driving mechanism thereafter.

A related object of the invention is to provide a drive which is not exposed, thereby enhancing safety during operation of the machine, the arrangement also permitting removal of the flywheel without disassembling any associate apparatus.

Other objects and features of the invention will be apparent from the following description read in conjunction with the accompanying drawings in which.

Figure 1:
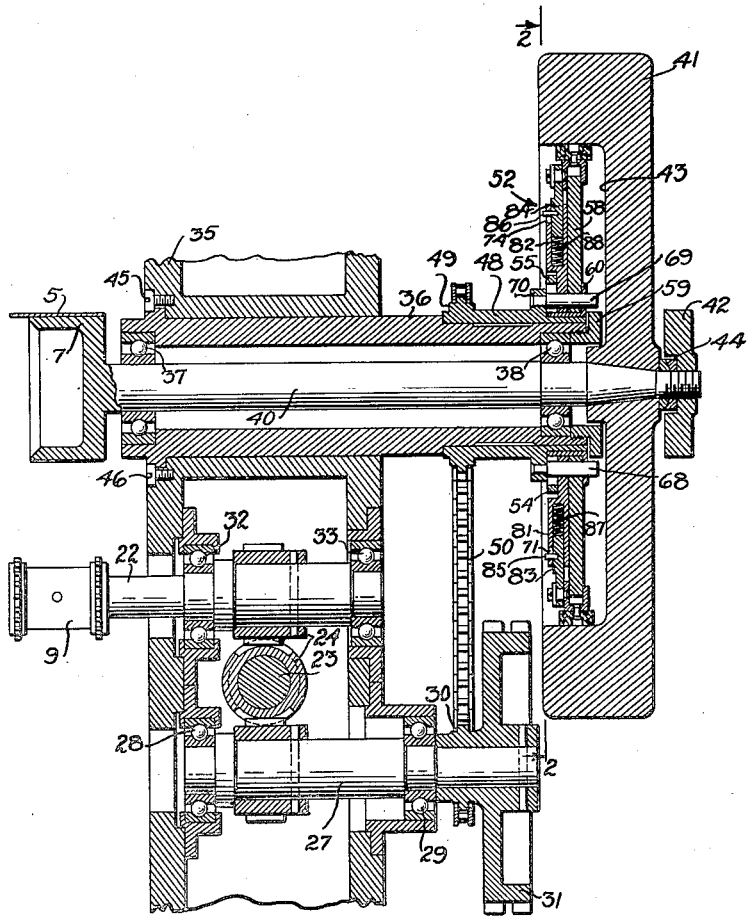
Fig. 1 is a cross sectional view of the sprocket, drum and flywheel assembly.

Referring now to drawings in which the same numerals identify the same elements, a film 5 from a supply reel or picture projecting apparatus (not shown) passes between an edge guide roller 6 and a drum 7, around a filter roller 8, around a drive sprocket 9, over a guide roller 10, around a hold back sprocket 11, over a guide roller 12, to a take-up reel (not shown). Although the invention has been disclosed embodied in a sound reproducer, it is to be understood that it also is applicable to a sound recorder. The present reproducer includes a light source 15 of constant intensity and an optical unit 16 having projection lenses and a slit, the slit being projected on the film at a translation point 17. The emergent light from the film is received on an optical unit 20 which also has a slit therein for defining the area of illuminated film which is impressed upon a photoelectric cell 21. The photoelectric cell 21 may be mounted on any suitable mount 18.

The continuously rotatable drive sprocket 9 is mounted on a shaft 22 rotatable in bearings 32 and 33 and driven by a shaft 23 through gears 24. The hold back sprocket 11 is also driven by the shaft 23 through gears 25. The gear on shaft 23 driving the sprocket 9 also drives a counter shaft 27, mounted on bearings 28 and 29, and having thereon sprocket wheels 30 and 31, the wheel 31 driving a take up reel (not shown).

The shafts 22 and 27 are parallel and are mounted on a wall 35, this wall also supporting a quill 36 having bearings 37 and 38 at each end thereof in which a shaft 40 is adapted to rotate, the shaft 40 carrying the drum 7 at one end thereof and a flywheel 41 at the other end. The flywheel is maintained on the shaft 40 by means of a lock nut 42 and self aligning washers 44, and is undercut as shown at 43. The quill 36 is maintained in position in the wall 35 by means of screws 45 and 46. Rotatably mounted on the end of the quill adjacent the flywheel is a hollow rotatable shaft 48 carrying a sprocket 49 driven from the sprocket 30 on shaft 27 by means of a chain 50. Also mounted on the hollow shaft 48 is a clutch mechanism generally indicated at 52. The shaft 48 and clutch 52 are held in position by lock nut 59.

Figure 2:
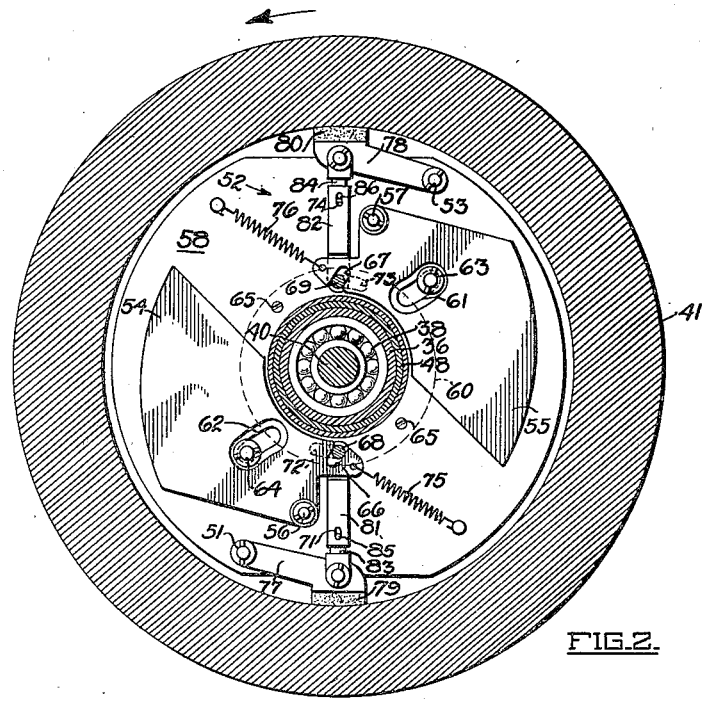
Fig. 2 is a cross sectional view of Fig. 1 taken along the line 2—2.
Figure 3:
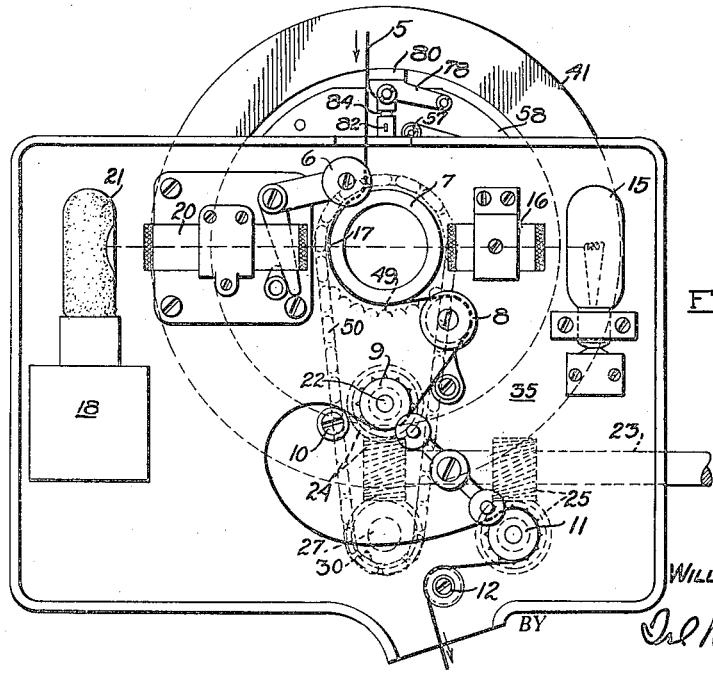
Fig. 3 is a diagrammatic view of the mechanism of Figs. 1 and 2 shown in relationship to a sound reproducing system.

Referring specifically to Figs. 1 and 2, the clutch assembly includes centrifugal weight elements 54 and 55 pivoted at points 56 and 57, respectively, to a disc 58. These centrifugal weights are limited in their motion about the pivots by slots 61 and 62 cut therein and pins 63 and 64, respectively, attached to the disc 58. Each of the elements 54 and 55 has at similar portions thereof notches 66 and 67 which accommodate pins 68 and 69, the pins 68 and 69 being attached to a projection 70 integral with the rotatable shaft 48, the pins also having a freedom of motion with respect to the disc 58 within the limits of slots 72 and 73. A flanged sleeve 60 is attached to disc 58 by screws 65 and forms a bearing for motion of the disc and the elements attached thereto with respect to the shaft 48 within the limits of slots 72 and 73. The weight elements 54 and 55 are biased in the same direction by means of springs 75 and 76 connected between the weight elements and the disc 58.

Also pivoted at 51 and 53 on the disc 58 are a pair of arms 77 and 78 carrying on their extremities friction shoes 79 and 80. The arms 77 and 78 are connected to the pins 67 and 68 by means of sleeves 81 and 82 and rods 83 and 84 within the sleeves, the rods having transverse pins 85 and 86 which are movable within slots 71 and 74 cut in the sleeves 81 and 82. Within the sleeves 81 and 82 are compression springs 87 and 88 (see Fig. 1) which tend to extend the rods 83 and 84 to the outer extremities of the slots 71 and 74, these springs cushioning any shocks produced by contact of the shoes 79 and 80 with the flywheel. The springs also provide against eccentricity affecting operation of the clutch.

From Fig. 2 it is seen that the sleeves 81 and 82 and rods 83 and 84 are substantially radial with respect to the shaft 40; the pins 68 and 69 are in a definite position in slots 72 and 73; and the shoes 79 and 80 are in contact with the flywheel. Now should the pins 68 and 69 be at the other extremities of the slots 72 and 73, it is apparent that the friction shoes 79 and 80 will be disconnected or removed from the flywheel 41 since the distance from the pins to the shoes has increased. This action is what occurs at the release point which will be explained later. Also from Fig. 2 it will be seen that when the pins 68 and 69 are in the release position the centrifugal weight elements 54 and 55 will be at their extreme outwardly positions within the limit of slots 61 and 62 since the notches 66 and 67 have the pins 68 and 69 located therein. It will be observed therefore that when the shoes 79 and 80 are in contact with the flywheel, the pins 68 and 69 are to the limit of their slots in the direction of motion of the apparatus as shown by the arrow and the weight elements 54 and 55 are at their inwardly positions. When the shoes 79 and 80 are disconnected from the flywheel, the pins 68 and 69 are at the opposite ends of the slots 72 and 73 and the weight elements 54 and 55 are in their extreme outwardly positions.

Although the operation of this clutch mechanism is fully disclosed in the above identified co-pending application, it will be briefly reviewed here. In starting the apparatus the clutch mechanism 52 is rotated by the chain 50 as shown by the arrow. As the springs 75 and 76 have already forced the shoes 79 and 80 into contact with the flywheel, the elements 54 and 55 will be at their inwardly positions and the pins 68 and 69 at the positions shown in Fig. 2. Thus the flywheel is connected to the clutch and rotated thereby. It is to be observed that the pins 68 and 69 are the driving elements and their natural drive position is as shown in Fig. 2 which is the connect position for the clutch. That is, any tendency of the pins to move faster than the disc 58 will maintain the pins in the position shown thus maintaining contact of the friction shoes with the flywheel.

With the friction shoes in contact with the flywheel, the flywheel is rotated along with the sprocket 9, and the drum 7, therefore, is brought up to speed simultaneously with the sprocket 9.

A feature of this particular mechanism is that any reaction on the friction shoes 79 and 80 contrary to the direction of rotation which is caused by acceleration, will maintain the pins 68 and 69 in the correct position. This may be considered an inertia effect. As soon, however, as the mechanism reaches uniform speed this reactive force on the shoes 79 and 80 is removed with the result that centrifugal force acting through weights 54 and 55 pulls the pins 68 and 69 to the opposite ends of the slots 72 and 73 thus removing the friction shoes 79 and 80 from the flywheel. This release will always occur at uniform speed and is not subject to any particular uniform speed within the limit of several hundred revolutions per minute with the design shown. For other ranges of speeds the elements must be proportioned accordingly.

In the particular disposition of drum, flywheel, clutch and driving mechanism shown several distinct advantages have been obtained. The chain drive 50 is not exposed to the operators of the device since it is shielded by a smooth flywheel, thus providing a safety factor. The clutch mechanism is also not exposed but contained within the flywheel itself. The flywheel is easily removed from its shaft 40 by simply unloosening the lock nut 42. After the flywheel is once removed the clutch mechanism itself may be taken off the quill by removing the nut 59 which maintains the shaft 48 in position. The entire drum 7, shaft 40 and quill 36 may now be removed from the wall support 35 by simply removing the screws 45 and 46 which hold the quill to the wall. There thus is disclosed a particularly advantageous assembly of drum, flywheel and clutch which may be easily assembled and disassembled for adjustment and/or repair.

I claim:

1. A system for the continuous and uniform advancement of a film past a translation point comprising a film roller, a shaft having said roller mounted on one end thereof, a flywheel mounted on the other end of said shaft, a quill within which said shaft is rotatable, a bearing exterior of said quill and at one end thereof, a hollow rotatable shaft adapted to rotate on said bearing, means for driving said hollow shaft, and means for interconnecting said shaft with said flywheel during acceleration of said flywheel and for instantly disconnecting said shaft from said flywheel when said flywheel has reached uniform speed, said flywheel being driven thereafter by said film at the speed of said flywheel when released.

2. A system in accordance with claim 1 in which said last mentioned means comprises friction shoes contacting with an inner surface of said flywheel and centrifugally controlled elements adapted to remove said friction shoes from said flywheel when said flywheel has reached uniform speed.

3. A film driving apparatus comprising a continuously rotatable sprocket, a drum normally adapted to be rotated by film passing over said drum and said sprocket, a hollow support, a shaft passing through said support having said drum mounted on one end thereof, a flywheel mounted on the other end of said shaft, said flywheel being undercut on the side toward said drum, a hollow rotatable shaft mounted on said support adjacent said flywheel and means in addition to said film for driving said drum and flywheel simultaneously and at the same peripheral speed as said sprocket during acceleration of said drum, sprocket and flywheel, said means being mounted on said hollow shaft and disposed within the undercut portion of said flywheel and contacting the circumference of said undercut portion.

4. A system in accordance with claim 3 in which said last mentioned means comprises centrifugally operated friction shoes which contact said flywheel during acceleration thereof and which are removed from said flywheel when uniform speed is obtained.

5. A film drum and flywheel assembly comprising a quill element, a support, means for mounting said quill to said support, a shaft within said quill, a drum mounted on one end of said shaft and a flywheel mounted on the other end thereof, a rotatable shaft on one end of said quill, a clutch carried by said rotatable shaft adapted to contact said flywheel during acceleration thereof and be released from said flywheel at uniform speeds of said flywheel, said flywheel being thereafter driven by film at the same speed as said uniform speed, means for maintaining said rotatable shaft on said quill and means for maintaining said flywheel on said first shaft, said flywheel being individually removable from said shaft, said clutch being removable from said quill and said quill being removable from its support.

6. A film driving apparatus comprising a continuously rotatable sprocket, a drum normally adapted to be rotated by film passing over said drum and said sprocket, a shaft having said drum mounted on one end thereof, a flywheel mounted on the other end of said shaft, said flywheel being undercut on the side towards said drum, a hollow rotatable shaft adapted to rotate concentrically with said first shaft, said rotatable shaft being mounted adjacent said flywheel, and clutch means between said rotatable shaft and said flywheel located in the undercut portion of said flywheel and contacting the circumference of said undercut portion.

7. An apparatus in accordance with claim 6 in which said clutch comprises inertially operated friction shoes for maintaining contact with said flywheel and centrifugal members for breaking contact of said shoes with said flywheel.

8. An apparatus in accordance with claim 6 in which said rotatable shaft is driven at a point between said drum and said flywheel.

WILLIAM A. BLACK.